Dec. 22, 1964 R. W. SANDERS 3,162,857
PULSE-POSITION MODULATION TELEMETRY SYSTEM
Filed March 14, 1960 7 Sheets-Sheet 1

Fig. 1

RAY W. SANDERS
INVENTOR.

BY Allen E. Botney

ATTORNEY

Dec. 22, 1964  R. W. SANDERS  3,162,857
PULSE-POSITION MODULATION TELEMETRY SYSTEM
Filed March 14, 1960  7 Sheets-Sheet 2

Fig. 2

RAY W. SANDERS
INVENTOR.

BY Allen E. Botney
ATTORNEY

United States Patent Office 3,162,857
Patented Dec. 22, 1964

3,162,857
PULSE-POSITION MODULATION TELEMETRY
SYSTEM
Ray W. Sanders, Los Angeles, Calif., assignor, by mesne
assignments, to Space-General Corporation, Glendale,
Calif., a corporation of California
Filed Mar. 14, 1960, Ser. No. 14,728
19 Claims. (Cl. 343—203)

The present invention relates in general to the communication arts and more particularly to a novel digitalized telemetry system.

In the exploration of space, the telemetry system provides the eyes and the ears for the scientist and, therefore, largely determines the success of such exploratory missions. Consequently, the extension of space investigations to the limits of the solar system or beyond is likely to depend for its success more on advancements which can be made in the field of telemetry than on any other factor.

The rapid developments of the past few years in missile and space technology have produced extended and new telemetry system requirements which must be met if present and future explorations in space are to be fruitful. Thus, one of the outstanding differences between the requirements for telemetry systems in the past and those of the present and future results from the enormous increase in ranges over which effective and reliable transmission must be provided. Rather than the hundreds of thousands of miles involved in past and present day space investigations, ranges of $10^7$ to $10^9$ miles may be expected to become typical and explorations at these vast distances from the earth can only be of value if information or data can be radioed back.

In addition to the problem of extending the range of telemetry systems to meet present and future needs, it has also long been considered desirable in telemetry design to make a system as sophisticated as possible consistent with weight and space requirements. Ideally, a system of this sort would be able to choose only pertinent information and transmit it at selected times, thus saving considerably in bandwidth and power. One step toward providing a more sophisticated telemetry system is to incorporate in it a variable data rate feature by which, as the phrase implies, data may be transmitted back at any one of a large number of available data rates.

Variable data rate primarily offers power economy. An example would be a system alternately turned on and off. When on, the data rate is some nominal maximum; when off, the rate is zero. By controlling the on-off times, the effective data rate can be varied over a wide range. If the meaningful data is properly encoded and stored, a worthwhile saving in power can be realized. However, above and beyond the saving of power, there is a further advantage or benefit to be derived by being able to vary the data rate since a reduction in data rate is accompanied by a corresponding reduction in system bandwidth. Accordingly, by being able to change the data rate and, thereby, the operating bandwidth, a practical method is provided for closely matching system operating conditions to actual signal level requirements as range changes, which is to say that it becomes possible to exchange data rate for accuracy within the system to match a specific mission requirement which, in turn, makes an operating link possible at distances otherwise impossible. Existing systems can accommodate different data rates but have little flexibility in this respect, providing no capability for exchanging data rate for accuracy when varying requirements make it desirable for this to be done.

Considering present day telemetry systems still further, another limitation of them is that they are generally analog systems which are objectionable for a number of reasons. One reason for objection, for example, is that in analog systems noise can vary the information modulation to cause errors in the received data. Digital systems, on the other hand, are inherently accurate in that, once above threshold, the output signal-to-noise ratio is independent of the carrier signal-to-noise. It is essentially true, therefore, that if any information is received at all, it is correct information. Digital modulation also offers other advantages over analog modulation—in speed and capability, bandwidth, and relative signal power required, as may be seen from a comparison of some of these parameters made by L. C. Watson and M. Goldstein in a paper presented by them at the 1959 National Telemetering Conference.

It is, therefore, an object of the present invention to provide a telemetry system that reliably transmits information over greatly increased ranges.

It is another object of the present invention to provide a telemetry system that can transmit data at a variable rate.

It is a further object of the present invention to provide a telemetry system wherein the accuracy with which data is transmitted may be exchanged with the rate at which it is transmitted.

It is an additional object of the present invention to provide a telemetry system that is economical in its power consumption or requirements.

It is a still further object of the present invention to provide a telemetry system having a variable transmission bandwidth.

The present invention achieves the above-stated objects and thereby substantially eliminates many of the prime disadvantages and limitations of prior telemetry systems by providing an orthogonal type of telemetry system that transmits analog information in digital form, the system being able, furthermore, to transmit this digitalized data at a variable rate. Stated in a different way, the present invention provides a digitalized telemetry system of the orthogonal type which can transmit the data at any one of a plurality of available rates, the benefits to be derived from such a system being, among others, economy in the use of power and increased range of operation.

In transmitting data, the present invention employs the feature of pulse-position modulation, sometimes also called pulse-time modulation, by which is meant that the time of occurrence of the carrier pulses to be transmitted is varied in accordance with the intelligence. More specifically, as the feature is employed herein, the variations in time-spacing between transmitted pulses are made to correspond to the variations in amplitude of the data signals. At the receiver end, the reverse process takes place as may be expected, the variations of pulse position being converted to corresponding variations of signal amplitude. While it is recognized that the concept of pulse-position or pulse-time modulation is known, it is considered that the apparatus embodying this feature is new and novel. Furthermore, the present invention includes many other significant features as will be seen later from the detailed description and when all are combined in an embodiment of the invention, it is considered that a new and novel combination or arrangement of apparatus is involved.

By way of example, one such additional feature resides in the fact that an unmodulated carrier need not be transmitted along with the data and synch signals as is the case among telemetry systems found in the prior art. In other words, a system according to the present invention possesses the advantage over other systems of not requiring a coherent carrier signal at the ground for efficient operation. A system of this sort is obviously less complex and, in addition, as will be recognized by those skilled in the communication arts, this feature leads to a further saving of power.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
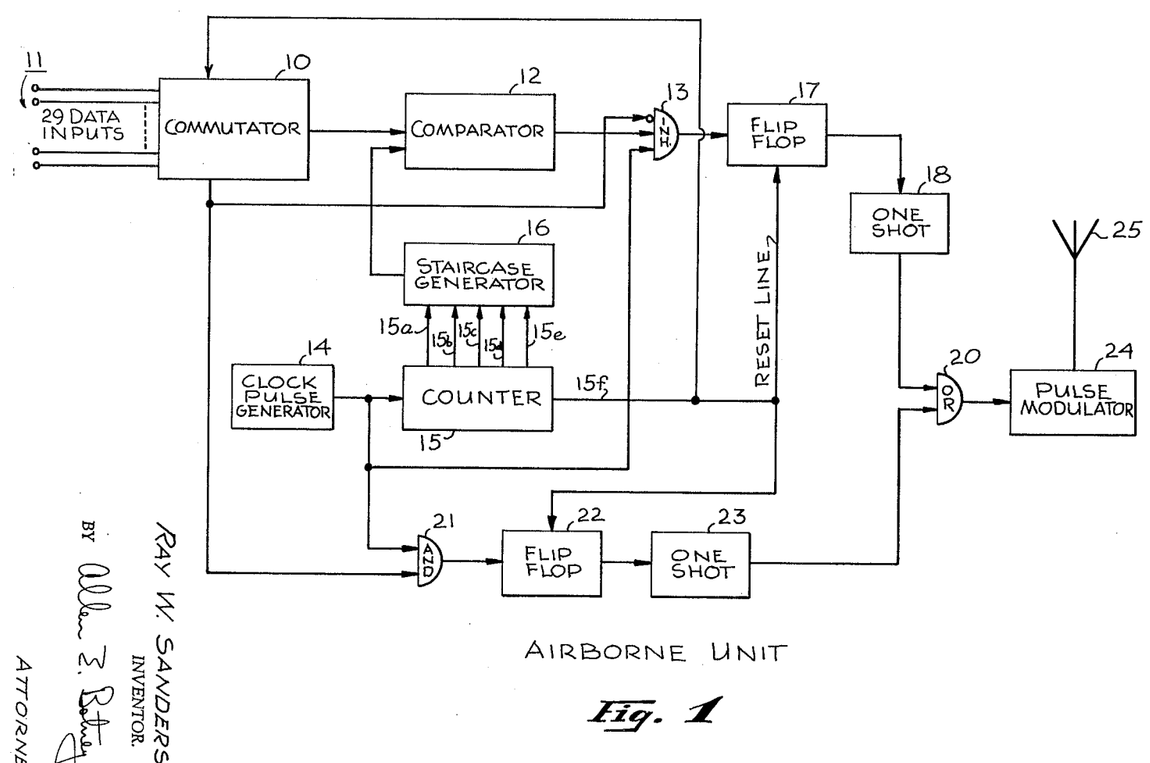
FIGURE 1 is a block diagram of the Airborne unit in a telemetry system according to the present invention.
Figure 2:
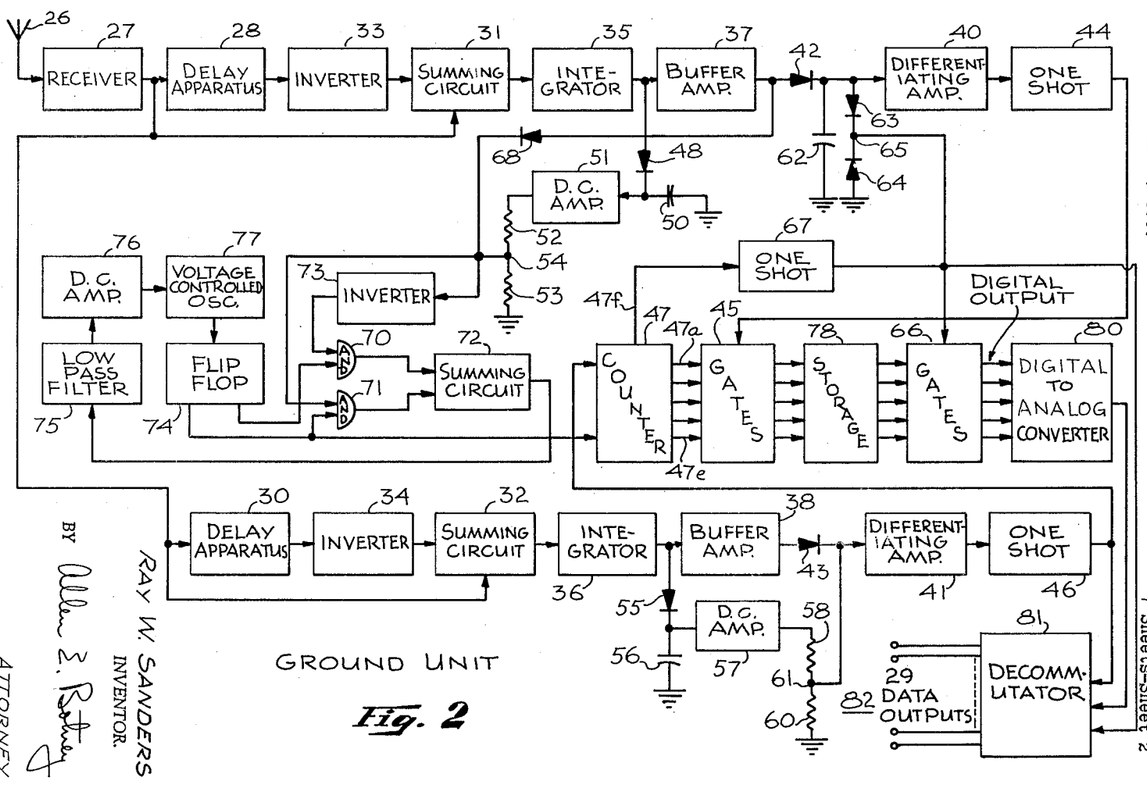
FIGURE 2 is a block diagram, partly in schematic form, of the Ground Station apparatus in a telemetry system according to the present invention.

Referring now to the drawings, particular reference is made to FIGURES 1 and 2 wherein are respectively shown the Airborne and Ground units of a telemetry system according to the present invention.

Considering FIGURE 1 first, the Airborne apparatus is shown to comprise a commutator 10 to which information in the form of analog signals is applied via a plurality of input terminals generally designated 11. In the present instance, the commutator is shown to have 29 data input terminals although other numbers of such terminals may also be used, as will become apparent later. Commutator 10 is in the nature of a switch which successively connects each input terminal 11 into the system, thereby permitting a large number of information channels to be handled by the system. Commutator 10 has two output lines, one of them being connected to one of two input terminals to a comparator 12 and the other being connected to the inhibit terminal of a 3-terminal inhibit gate 13. The inhibit gate's second input terminal is connected to the comparator output while its third input terminal is connected to a clock pulse generator 14. With respect to comparator 12, this device is of the type that compares the voltage levels of signals applied to it and produces an output pulse when the voltage levels of the signals are equal.

Clock pulse generator 14 is also connected to a counter circuit 15 that is preferably resettable in nature, the device thereby oftentimes being referred to as a "ring" counter. Counter 15 has five output lines 15a–15e connected to a staircase voltage generator 16 which, as its name implies, produces a stepped output voltage. Although the staircase generator may take many forms, a preferred arrangement is that of five differently weighted resistors respectively connected between output lines 15a–15e and one end of a load resistor whose other end is grounded. The one end of the load resistor would constitute the output for staircase generator 16 and, therefore, would be connected to the other of the two input terminals to comparator 12, as is shown in the figure. Incidentally, by "weighted" it is meant that the resistors have different values of resistance by which means the voltage steps are produced.

Considering the counter 15 still further, the counter has a sixth output line 15f which connects to a flip-flop circuit 17 for the purpose of periodically resetting the flip-flop and also connects to commutator 10 for the purpose of "stepping" the commutator to successively connect its many input terminals into the system. In addition to its connection to counter 15, flip-flop 17 is connected between the output end of inhibitor gate 13 and a one-shot multivibrator 18 whose output end, in turn, is connected to one of the two input terminals to an "OR" gate 20.

Returning now to commutator 10 and clock pulse generator 14, the clock pulse generator and the commutator are respectively connected to the two inputs to an "AND" gate 21, a flip-flop circuit 22 being connected between the AND gate at the output end thereof and a one-shot multivibrator 23. Flip-flop 22 is also connected to reset line 15f belonging to counter 15 for the reason mentioned in connection with flip-flop 17, namely, so that flip-flop 22 may periodically be reset. As for one-shot 23, like one-shot 18, it is connected at its output end to OR gate 20, one-shot 23 being connected to the second input terminal of the gate. Finally, a pulse modulator 24 is coupled between the OR gate and a transmitter antenna 25.

Having thus described the Airborne portion of the system, reference is now made to FIGURE 2 wherein the Ground Station apparatus is shown to include a receiver antenna 26 coupled to a conventional receiver 27 which demodulates incoming signals and also provides suitable amplification for these signals. The output end of receiver 27 is connected to first and second signal delay apparatus 28 and 30 as well as to first and second summing circuits 31 and 32, a first inverter 33 being connected between delay apparatus 28 and summing circuit 31 and a second inverter circuit 34 being connected between delay apparatus 30 and summing circuit 32. The summing circuits mentioned are well known and are of the type that linearly add the signals applied to them. As for delay apparatus 28 and 30, they are of the same type but differ from each other in their time delays, as will be seen later when the time delays involved will be specified with greater particularity.

Summing circuits 31 and 32 are respectively connected at their output ends to a pair of integrator networks 35 and 36, the integrator networks, in turn, being respectively connected at their output ends to a pair of buffer amplifiers 37 and 38. Between the two buffer amplifiers and a pair of differentiating amplifiers 40 and 41, there is connected a pair of unidirectional devices, such as diodes 42 and 43, diode 42 being connected between amplifiers 37 and 40 and diode 43 being connected between amplifiers 38 and 41. Specifically, the anodes of these diodes are respectively connected to the buffer amplifiers whereas their cathodes are respectively connected to the differentiating amplifiers. Differentiating amplifier 40 is connected at its output end to a one-shot multivibrator 44 whose output feeds into a plurality of gating circuits collectively designated 45. Differentiating amplifier 41, on the other hand, is connected to a one-shot multivibrator 46 whose output feeds into a counter 47 of the same kind utilized in the Airborne unit. More about gates 45 and counter 47 will be said later.

Returning now to integrator network 35, the output end of this integrator is also connected through a unidirectional device, such as a diode 48, and a capacitor 50 to ground. The diode and capacitor are connected in series with the diode anode being connected to the integrator and the diode cathode being connected to the capacitor. At the junction of diode 48 and capacitor 50, connection is made to a direct-current amplifier 51 which then connects to a voltage divider comprising a pair of resistors 52 and 53 connected in series between the direct-current amplifier and ground. The junction between resistors 52 and 53 is designated 54.

In a like manner, the output end of integrator network 36 is also connected through a diode 55 and a capacitor 56 to ground, the diode and capacitor being connected in series therebetween with the diode anode connecting to the integrator and the diode cathode connecting to the capacitor. At the junction of diode 55 and capacitor 56, connection is made to a direct-current amplifier 57 which, as before, then connects to a voltage divider including a pair of resistors 58 and 60 connected in series between the amplifier and ground. The junction between resistors 58 and 60 is designated 61.

Referring again to diode 42 at the output end of buffer amplifier 37, the cathode terminal of this diode is also coupled to ground through a capacitor 62 which is shunted by a pair of series-connected diodes 63 and 64 whose cathode elements are joined to each other at junction point 65, as shown in the figure. Junction point 65 is connected to a plurality of gating circuits which are collectively designated 66 and is also connected to the output end of a one-shot multivibrator 67. At the input end of the one-shot multivibrator, the one-shot is connected to an output terminal of counter 47, the output terminal being designated 47f. Gates 66 and one-shot 67 will be discussed again later. As for the anode terminal of diode 42, this terminal is connected to the anode of a diode 68 that couples diode 42 to junction point 54, the cathode of diode 68 being connected to the junction point.

The Ground Station apparatus further includes a pair of "AND" gates 70 and 71, each having two input terminals, the outputs from the AND gates feeding into the two inputs, respectively, of a summing circuit 72. A first input terminal of gate 70 is coupled to junction point 54 through a phase inverter circuit 73 whereas a first input terminal of gate 71 is connected directly to junction point 54. With respect to the second input terminals of AND gates 70 and 71, they are respectively connected to the two outputs from a flip-flop circuit 74. Looking now to summing circuit 72, its output end is coupled first through a low-pass filter 75 and second through a direct-current amplifier 76 to a voltage-controlled oscillator 77, the output of the oscillator being tied to the input of flip-flop 74.

The output terminal of flip-flop 74 that is connected to AND gate 71 is also connected to counter 47 which, it will be remembered, is connected at one of its outputs, designated 47f, to one-shot 67. According to the manner in which the invention is embodied herein, counter 47 also includes five other output lines 47a–47e by means of which the counter is connected to gates 45. Although not shown, there are five gating circuits in gates 45, one for each one of lines 47a–47e, and, when activated, these gating circuits connect the counter to a storage unit 78. The storage unit is of a type that is capable of storing or "remembering" only the data most recently applied to it and of erasing all previously applied data. Storage unit 78 also has five output lines and these are connected to gates 66 which are like gates 45. Hence, gates 66 also include five gating circuits, one in each of the output lines of storage member 78, and when they are activated they respectively connect the output lines of the storage member to the several input terminals of a digital-to-analog converter 80. This digital-to-analog converter is connected at its output to a decommutator 81 which is also connected at a second input terminal to one-shot 46. On the other hand, for the purpose of "stepping" the decommutator to successively connect its many output lines into the Ground Station apparatus, a third input terminal of the decommutator is connected to one-shot 67. The output for the entire Ground Station apparatus is also the output for decommutator 81. Accordingly, the decommutator has as many data output terminals as commutator 10 in the Airborne unit has data input terminals, namely, twenty-nine such terminals and they are generally designated 82.

Figure 3:
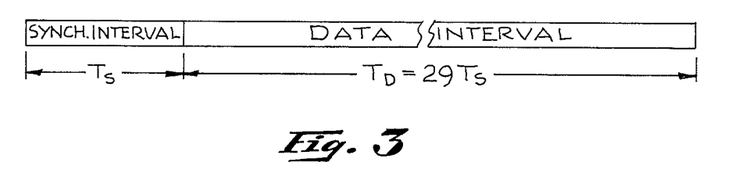
FIGURE 3 illustrates transmission sequences of the system of FIGURES 1 and 2.

In considering the mode of the operation of the subject invention, it should initially be mentioned that two intervals of time are periodically involved in the operation, namely, a synch interval and a data interval, the data interval following the synch interval. As implied, a synchronizing signal is transmitted during the synch interval and data signals are transmitted during the data interval. Moreover, as the invention is embodied herein, twenty-nine data signals are transmitted after each synch signal and it is for this reason that the duration of the data interval is substantially twenty-nine times that of the synch interval as FIGURE 3 attempts to illustrate. It should further be mentioned that in presenting the operation, the synch interval will be taken up for discussion first followed by a discussion of the data interval. The events of the two intervals will then be combined for a complete understanding.

Figure 4A:
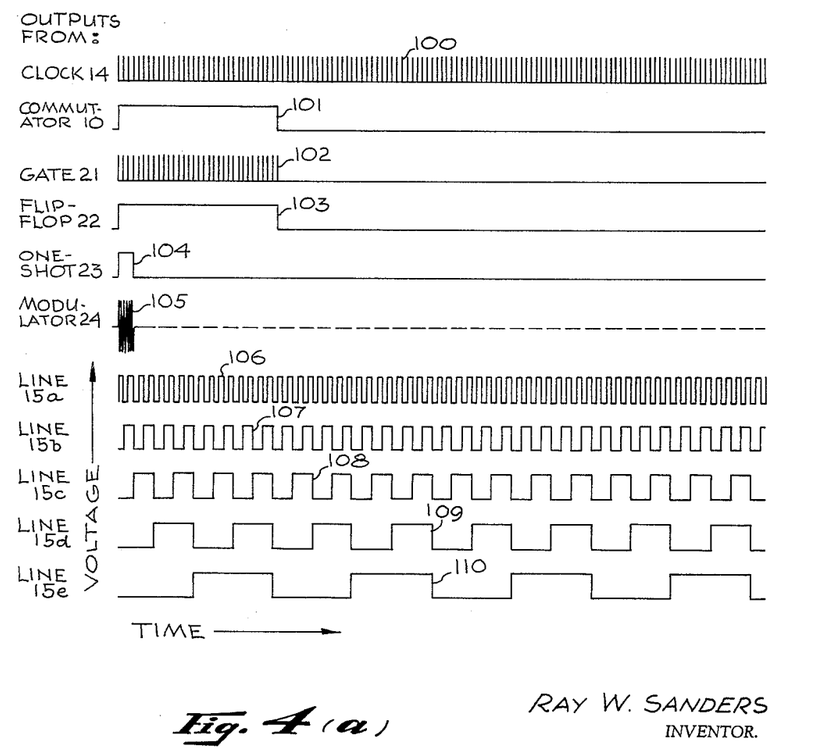
FIGURES 4a and 4b illustrate the voltage waveforms that may exist at various points in the Airborne unit of FIGURE 1.
Figure 4B:
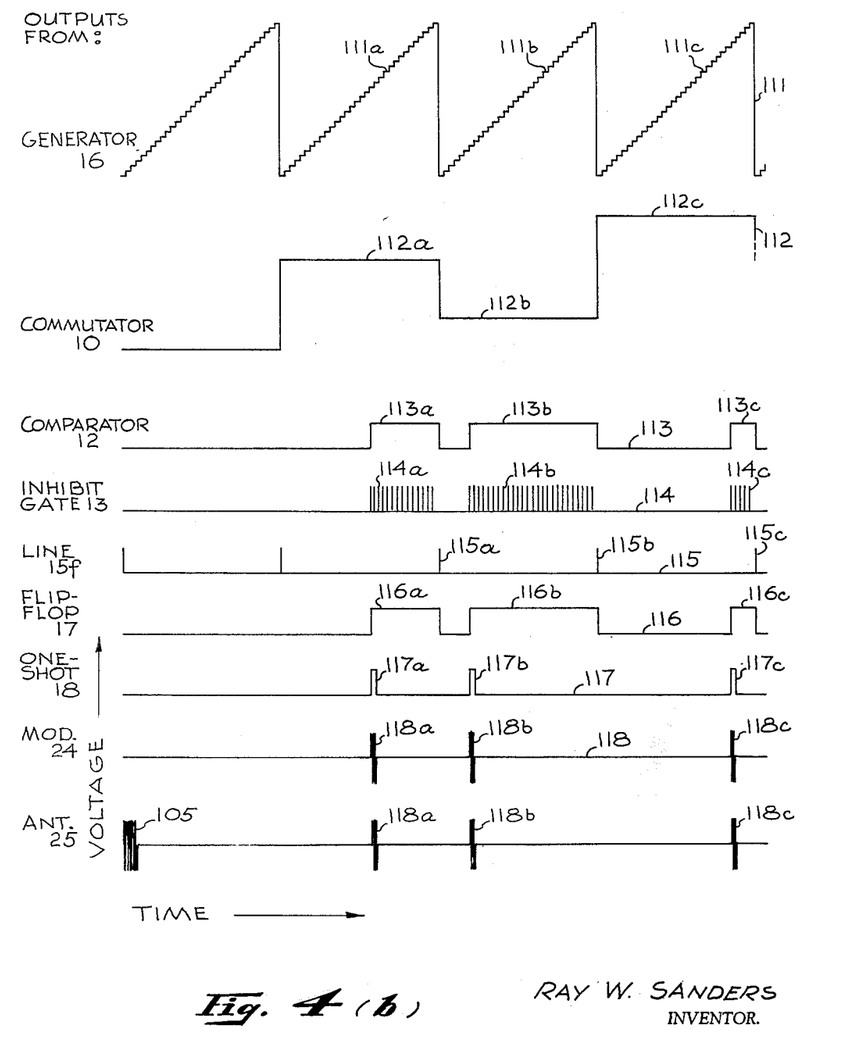

Accordingly, referring to the Airborne unit shown in FIGURE 1 and the waveforms of FIGURES 4a and 4b, clock pulse generator 14 generates a pulse train of the type shown by waveform 100 and these pulses are not only applied to counter 15 and inhibit gate 13 but also to AND gate 21. At the same time, a synch pulse 101 is generated by commutator 10 and this pulse is applied both to the inhibit terminal of inhibit gate 13 and to AND gate 21. As a result, the inhibit gate is biased "OFF" and no signals of any sort pass through the inhibit gate for the duration of pulse 101. However, for the duration of this synch pulse, a number of clock pulses, designated 102, do pass through AND gate 21 and they are applied to a flip-flop circuit 22. In response to the first of these pulses, flip-flop 22 generates a pulse 103 whose leading edge coincides with said first pulse. It would appear from the figure that pulses 101 and 103 start together but it should be mentioned here that this is not necessarily the case since pulse 101 may be generated by commutator 10 as that its leading edge falls between clock pulses 100 whereas the leading edge of pulse 103 always coincides with the first of pulses 102. Thus, the leading edges of pulses 101 and 103 may coincide or, more likely, be apart and it is for this reason that AND gate 21 and flip-flop 22 are employed in the unit, namely, to replace pulse 101 with another pulse (pulse 103) whose leading edge coincides with or, stated differently, is in alignment with one of the clock pulses. As for the lagging edge of pulse 103, that is, the duration of pulse 103, this is determined by a pulse out of counter 15 which resets the flip-flop and more will be said later about it.

Pulse 103 is applied to one-shot multivibrator 23 which, in response thereto, produces pulse 104 whose leading edge coincides with the leading edge of pulse 103 and has a predetermined duration. Specifically, the duration of pulse 104 is selected to be three times the duration of the data pulses for reasons that will be clear later when the operation of the Ground Station equipment is taken up for discussion. Suffice it to say for the present that pulse 104 is three times longer than each data pulse. Pulse 104 out of one-shot 23 is applied to and passed through OR gate 20 to pulse modulator 24 wherein a RF carrier is generated in response to it. In other words, in response to pulse 104, a pulsed RF carrier 105 is applied to transmitter antenna 25 from which it is radiated into space.

The synch interval is followed by the data interval during which twenty-nine information pulses are transmitted, the information being contained in the variable spacing between the pulses. More specifically, the data interval is divided into twenty-nine equal data periods with a pulsed carrier transmitted at some time during each such period, the variable pulse rate or, stated differently, the spacing in time between successive pulses, being the technique by which the information is transmitted.

Considering now this phase of the operation, clock pulses 100 out of clock pulse generator 14 are applied to counter 15, as mentioned previously, and, in response to these clock pulses, the counter respectively produces pulse trains represented by waveforms 106 to 110 at output terminals 15a to 15e. In accordance with the well-known principles of binary counter operation, the pulse repetition rate of pulse train 106 at terminal 15a is one-half the pulse repetition rate of clock pulse train 100.

Similarly, the pulse repetition rate of the pulse train produced at any one of the other terminals, that is, terminals 15b to 15e, is one-half that of the pulse train produced at the preceding terminal. It is thus seen that the pulse repetition rate of pulse train 109 is thirty-two times the pulse repetition rate of pulse train 110 at counter terminal 15e. Pulse trains 106 to 110 are simultaneously applied to staircase generator 16 whose output in response to these pulse trains is a periodically recurring staircase voltage or wave of staircase voltages 111, one staircase voltage being produced for each data period, that is to say, each staircase voltage begins and ends with a data period. Hence, there are twenty-nine staircase voltages during a complete data transmitting interval although only three such staircase voltages are shown in FIGURE 4b. The three shown are those immediately following the synch interval and these are designated 111a, 111b and 111c. Staircase voltage waveform 111 out of staircase generator 16 is applied to comparator 12.

Referring now to the input end of the Airborne unit, twenty-nine analog signals representing different types of information or data, such as pressure, temperature, radiation intensity, etc., are respectively applied to data input terminals 11. These analog signals are sampled rotatively, that is, in turn, by commutator 10 and at a steady predetermined rate, the signal samples being successively applied to comparator 12. More particularly, a sample of a different analog signal is taken during each data period so that a wave made up of twenty-nine different samples is formed during a complete data interval. Three such voltage samples, taken immediately after the synch interval are shown in FIGURE 4b, the waveform being designated 112 and the three samples being designated 112a, 112b and 112c. At this point it would be well to mention that although samples 112a, 112b and 112c appear to be of constant amplitude in the drawing that actually they are not. Rather, the amplitude of each voltage sample may vary in almost any manner. Furthermore, it will be recognized from what has been said that since staircase voltages 111a, 111b and 111c and voltage samples 112a, 112b and 112c respectively occur during the first, second and third data periods following the synch interval, staircase voltage 111a and voltage sample 112a coincide in time, staircase voltage 111b and voltage sample 112b coincide in time and, similarly, staircase voltage 111c coincides in time with voltage sample 112c.

As mentioned before, voltage waveforms 111 and 112 are applied to comparator 12 whose output terminal is normally at a zero voltage level. However, eventually the voltage level of the staircase voltage being applied to the comparator will reach or become equal to the voltage level of the data sample also being applied and when this occurs, the voltage level at the comparator output terminal will rise to some predetermined value and remain at that value until the end of the associated data period at which time the output terminal will return to a zero voltage level. In other words, in response to voltage waveforms 111 and 112, comparator 12 produces a pulse during each data period, the pulse so produced beginning when the voltage levels of the corresponding staircase and data sample voltages are equal and continuing until the end of that period. The sequence of pulses produced in this manner at the output of the comparator is designated 113 with the individual pulses being designated 113a, 113b and 113c. By superimposing waveform 111 on waveform 112, it will be noticed that pulse 113a is produced by voltages 111a and 112a, pulse 113b is produced by voltages 111b and 112b and, finally, pulse 113c is produced by voltages 111c and 112c. Furthermore, and most significantly, it will be noted that since the data samples are at different voltage levels, coincidence between the staircase and data voltages occur at different times in the data periods concerned, with the result that the time spacing between comparator pulses 113a, 113b and 113c varies and in a manner that corresponds to the different voltage levels of the data samples.

Voltage waveform 113 is applied to inhibit gate 13 and since no pulse is being applied to the inhibit terminal at this time the inhibit gate passes to flip-flop 17 those clock pulses that are applied to it that coincide in time with pulses 113a, 113b and 113c. In other words, in response to pulses 113a, 113b and 113c inhibit gate 13 respectively passes three groups of clock pulses 114a, 114b and 114c, the time spacing between these pulse groups being the same as that between the controlling pulses themselves. Also applied periodically to flip-flop circuit 17 is a reset pulse which occurs at the end of each data period. Thus, a train of reset pulses 115 is received by the flip-flop, the reset pulses involved herein being designated 115a, 115b and 115c. These reset pulses are produced by counter 15 on output line 15f and may be derived from waveform 110 also produced by the counter simply by differentiating this waveform and then using the voltage "spikes" that are coincident with the lagging or declining edges of the waveform pulses.

Accordingly, in response to clock pulse groups 114a, 114b and 114c, specifically, in response to the first clock pulses in these groups as well as reset pulses 115a, 115b and 115c, flip-flop 17 produces pulse sequence 116 comprising pulses 116a, 116b and 116c. Hence, the duration of the pulse produced by the flip-flop in any one data period extends from the occurrence of the first clock pulse applied to the flip-flop in that data period to the end of the period. It will be recognized that since the amplitudes of the data samples may actually vary during the sampling periods, as mentioned above, coincidence between staircase and data voltages may occur between clock pulses and, therefore, the leading edges of the pulses constituting waveform 113 out of the comparator may not coincide with any of the clock pulses generated. It is for this reason that pulse sequence 116 is produced and used rather than pulse sequence 113, as explained previously in connection with flip-flop 22.

Pulse sequence 116 is applied to one-shot multivibrator 18 which, in response thereto, produces another pulse sequence 117, pulses 117a, 117b and 117c thereof respectively being produced in response to pulses 116a, 116b and 116c. As may be seen from the figure, the leading edges of pulses 116 are used to activate the multivibrator so that they are in coincidence with the leading edges of pulses 117. Furthermore, it should be mentioned that the duration of pulses 117 is chosen so as to be one-third that of synch pulse 104 produced by one-shot 23. The reason for the difference in the durations of the pulses produced by one-shots 18 and 23 will become clear when the operation of the Ground Station apparatus is related.

Pulse train 117 is applied to and passed through OR gate 20 and thereafter applied to pulse modulator 24 which, as explained before, employs the pulses therein to trigger the generation of a corresponding train of pulsed carrier signals 118. Thus, pulsed carriers 118a, 118b and 118c are generated in response to pulses 117a, 117b and 117c, respectively. It should be additionally stated that the time spacing between pulses 117a, 117b and 117c and, therefore, the time spacing between pulsed carriers 118a, 118b and 118c is exactly the same as that between pulses 116a, 116b and 116c. Consequently, when pulsed carriers 118a, 118b and 118c are radiated into space by antenna 25, the time spacing between them is representative of the voltage levels of the data samples. The complete wave radiated by antenna 25, including both the synch and data signals, is also shown in the figure and is designated 119.

As already mentioned, twenty-nine data signals are transmitted by the embodiment during a complete data interval even though the transmission of only three such signals has been described herein. Accordingly, twenty-six more pulsed carriers with variable time spacing between them are transmitted in the same way before the termination of the data interval and the commencement once again of a synch interval. Thus, by the end of the data interval, commutator 10 has succeeded in connecting each of the twenty-nine data input terminals 11 to the commutator output and is in position to generate another synch pulse for application to the inhibit terminal of inhibit gate 13, thereby starting the cycle all over again.

Figure 5:
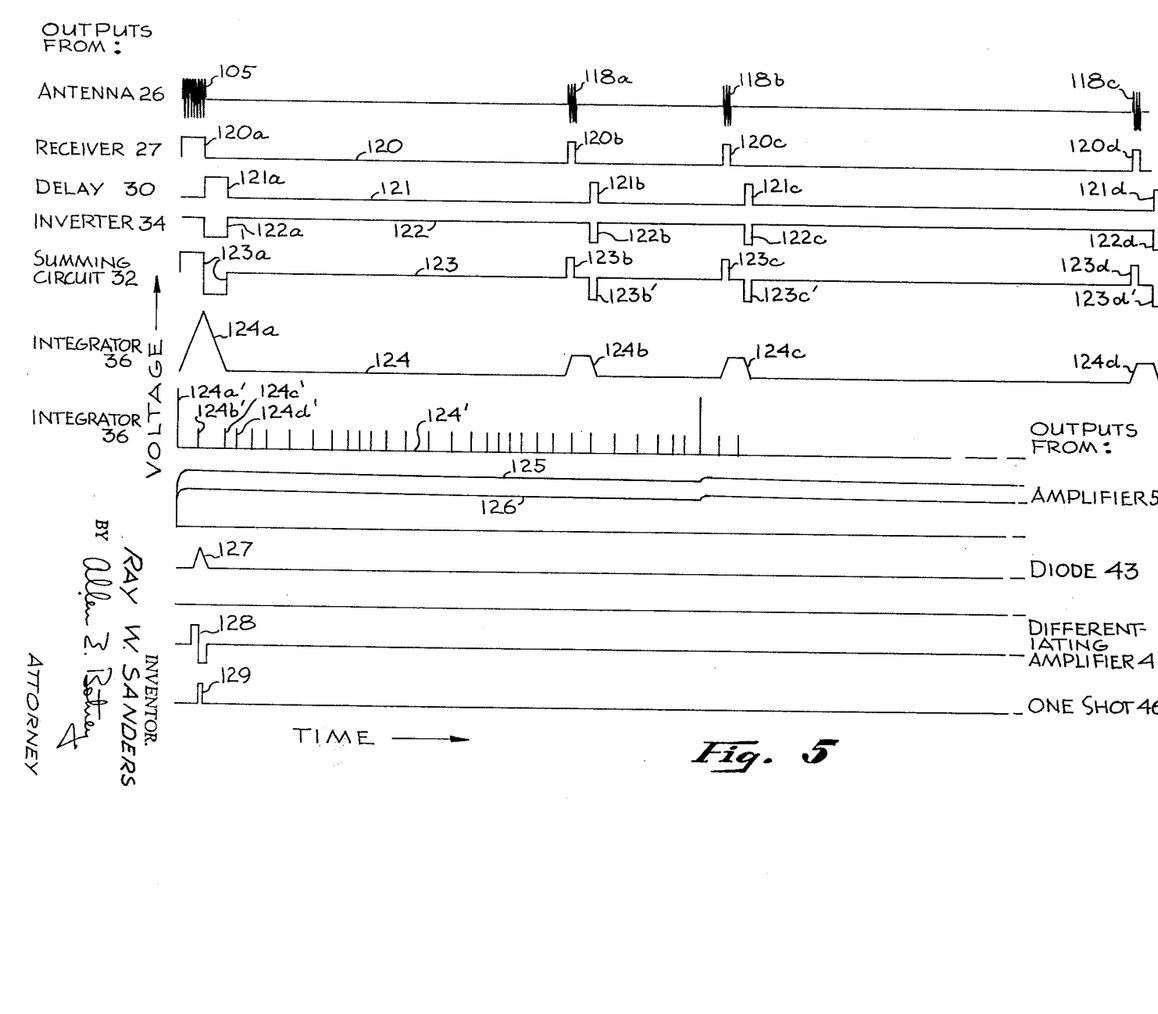
FIGURES 5, 6 and 7 illustrate the voltage waveforms that may exist at various points in the Ground Station apparatus of FIGURE 2.

Having thus described the operation of the Airborne unit, attention is now directed to the mode of operation of the Ground Station equipment and for this purpose reference is made to both FIGURES 2 and 5. Thus, the synch and data signals, such as signals 105 and 118 reproduced in FIGURE 5 for convenience, are received by receiver antenna 26 and applied to receiver 27 wherein they are demodulated to produce a pulse train 120 whose individual pulses are designated 120a, 120b, 120c and 120d. As will be recognized, pulse 120a is the synch pulse while pulses 120b, 120c and 120d are the data pulses.

Voltage waveform 120 is applied to delay apparatus 30 which delays the pulses thereof by an interval of time equal to the duration of synch pulse 120a. Consequently, the output of delay apparatus 30 is waveform 121 which is identical with waveform 120 except that the former is delayed with respect to the latter by the interval of time specified. Thus, as may be seen from the drawing, pulse 121a immediately follows pulse 120a whereas pulses 120b, 120c and 120d are not immediately followed by pulses 121b, 121c and 121d, respectively. The pulses of waveform 121 are now applied to inverter 34 which, as its name implies, inverts or reverses the polarity of these pulses. Hence, waveform 122 having pulses 122a, 122b, 122c and 122d is developed at the output end of inverter 34. Following this, waveforms 120 and 122 are applied to summing circuit 32 wherein the instantaneous voltage values of these waveforms are added. As a result, a composite voltage waveform 123 is produced by the summing circuit, pulse 123a therein being a combination of synch pulses 120a and 122a. Similarly, pulses 123b and 123b' correspond to pulses 120b and 122b, pulses 123c and 123c' correspond to pulses 120c and 122c, and pulses 123d and 123d' correspond to pulses 120d and 122d. Finally, waveform 123 is applied to integrator network 36 and, as a result of the integration process therein, pulse sequence 124 is produced, with pulse 124a being produced by integrating pulse 123a, pulse 124b being produced by integrating pulses 123b and 123b', etc. It is at this point that it will more clearly be understood why the duration of the synch pulse was purposely made three times that of a data pulse, namely, to make synch pulse 124a sufficiently different from data pulses 124b, 124c and 124d so that the synch pulse could be easily distinguished from the data pulses in the Ground Station equipment. It will be obvious from an examination of waveform 124 of the manner in which these pulses differ.

In order to continue the description of the operation in clear and understandable terms, it is now necessary to reproduce waveform 124 on a different time scale, specifically, a smaller time scale. As reproduced on this smaller time scale, waveform 124 is designated 124' in FIG. 5 and the corresponding pulses are designated 124a', 124b', 124c', and 124d'. As may be seen from waveform 124', synch pulse 124a' is followed by twenty-nine data pulses, starting with data pulses 124b', 124c', and 124d', before the next synch pulse is generated.

Voltage waveform 124' is applied to diode 55 which may normally be considered to be in a forward-biased state or condition. As a result, synch pulse 124a' passes through the diode to capacitor 56 which now quickly charges up so that the voltage across the capacitor and, therefore, the bias on the diode, becomes substantially equal to the amplitude of the synch pulse. However, in view of the fact that synch pulse 124a' is considerably greater in amplitude than the data pulses following, it will be obvious to those skilled in this art that diode 55 is back-biased insofar as the data pulses are concerned. Consequently, only synch pulse 124a' is permitted to pass through the diode, the voltage across capacitor 56 thereafter remaining substantially at the synch pulse amplitude. This direct-current biasing voltage is applied to D.C. amplifier 57 wherein it is amplified to some greater value, the voltage at the output end of the amplifier being illustrated as waveform 125 in FIGURE 5.

Voltage 125 is applied to one end of the voltage divider comprising resistors 58 and 60 and, as a result, the direct-current voltage between junction point 61 and ground is something less in amplitude than that of voltage 125. As a matter of fact, the voltage division, which is determined by the ratio of resistors 58 and 60, is such that the amplitude of the voltage across resistor 60, designated 126, is less than the peak value of synch pulse 124a' but significantly greater than the amplitude of data pulses 124b', 124c', 124d', etc. In consequence thereof, the application of voltage 126 to diode 43 back-biases the diode insofar as the data pulses are concerned, that is, bias-voltage 126 prevents the data pulses from getting through the diode, but does not prevent a portion of synch pulse 124a' from passing through. Specifically, the portion able to pass through diode 43 to differentiating amplifier 41 is that which exceeds voltage 126 in value. The portion of pulse 124a' actually passed is shown on the expanded time scale previously utilized and is designated 127.

As may be seen from the FIGURE 5 pulse 127 is substantially triangular-shaped. It will be recognized, therefore, that in differentiating pulse 127, differentiating amplifier 41 produces a pulse, such as pulse 128, which is first positive-going and then switches over to a negative going pulse, the switchover occurring when pulse 127 reaches a peak value and its slope changes from positive to negative. Pulse 128 is fed to one-shot multivibrator 46 which has been adapted to produce a positive pulse 129 at the moment of switchover in pulse 128. In other words, the leading edge of pulse 129 coincides with the peak of pulse 127. Pulse 129 is a reset pulse and is applied to decommutator 81 as well as to counter 47. Thus, by means of pulse 129, counter 47 and commutator 81 are periodically reset to synchronize them with the operation of the Airborne apparatus and in that way ensure that the data signals ultimately provided by the Ground Station accurately reflect the data signals originally applied to the Airborne unit.

Figure 6:
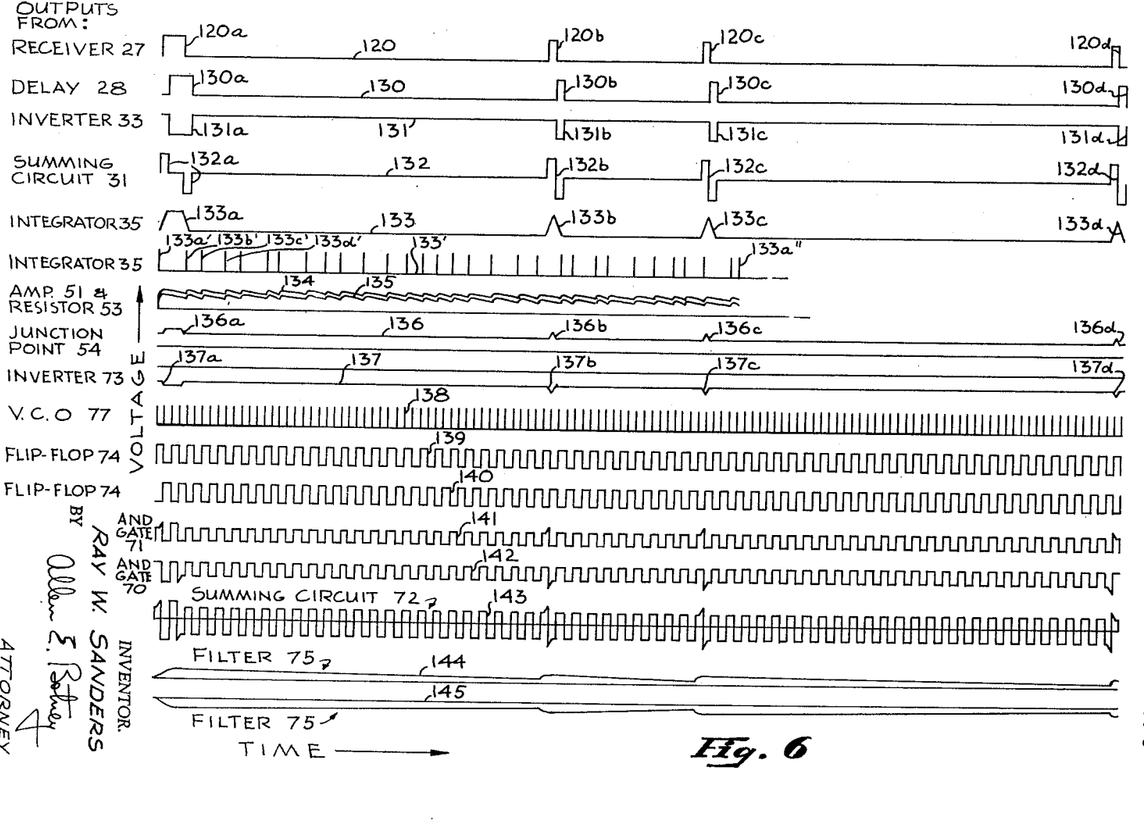

Attention is now directed once again to receiver 27 whose output, it will be remembered, is waveform 120 which is reproduced in FIGURE 6 for convenience. Waveform 120 is also applied to delay apparatus 28 which, instead of delaying the waveform pulses by an interval of time equal to the duration of synch pulse 120a as did delay apparatus 30, delays the waveform pulses by an interval of time equal to the duration of data pulses 120b, 120c and 120d. The resulting or delayed waveform out of delay apparatus 28 is designated 130 and its pulses 130a, 130b, 130c and 130d. The pulses of waveform 130 are now fed to inverter 33 which reverses the polarity of pulses 130a, 130b, 130c and 130d, that is, inverter 33 produces a voltage waveform 131 whose pulses 131a, 131b, 131c and 131d are coincident with but are inverted with respect to pulses 130a, 130b, 131c and 131d. As may be seen from FIGURE 2, waveforms 120 and 131 are both applied to summing circuit 31 which, as the name implies, linearly adds the instantaneous values of the pulses in these waveforms to produce a composite waveform 132 whose pulses 132a, 132b, 132c and 132d are as shown.

Integrator network 35 receives waveform 132 and, in response thereto, produces an output voltage 133 that is the integral of voltage 132. Thus, pulse 133a is obtained by integrating pulse 132a, pulse 133b is obtained by integrating pulse 132b, and pulses 133c and 133d are obtained by respectively integrating pulses 132c and 132d.

It will be noted that the synch and data pulses in the channel presently being described are all of the same peak amplitude whereas in the channel previously described the synch pulse was of considerably greater amplitude than the data pulses.

As before, it is now deemed beneficial in order to present a clear description to reproduce waveform 133 on a smaller time scale. As reproduced on this smaller time scale, waveform 133 is designated 133' in FIGURE 6 and the associated pulses are designated 133a', 133b', 133c' and 133d'. As may be expected, synch pulse 133a' is followed by twenty-nine data pulses, starting with data pulses 133b', 133c' and 133d', before the next synch pulse, designated 133a'', is generated.

Voltage waveform 133' is applied to diode 48 which may normally be considered to be in a forward-biased or conducting state. As a result, synch pulse 133a' passes through the diode to capacitor 50 which now quickly charges until the voltage across this capacitor and, therefore, the back-bias applied to the diode is substantially equal to the peak amplitude of the synch pulse. In view of the fact that the peak values of the data pulses are the same as that of synch pulse 133a', it will be obvious that diode 48 is now back-biased insofar as the data pulses are concerned and any future synch pulses. Consequently, only synch pulse 133a' gets through diode 48, the voltage across capacitor 50 thereafter remaining constant at the synch pulse amplitude except as the capacitor may lose some of its charge with the passage of time and become slightly recharged with each pulse. However, this merely introduces slight ripples in the voltage across the capacitor. The direct-current biasing voltage across capacitor 50 is applied to D.C. amplifier 51 wherein it is amplified to some greater value, the voltage at the output end of the amplifier being illustrated as waveform 134.

Voltage 134 is applied to one end of the voltage divider comprising resistors 52 and 53 and, as a result, the direct-current voltage between junction point 54 and ground, that is, across resistor 53, is the same as voltage 134 but is something less in amplitude. As a matter of fact, the voltage division, which is determined by the ratio of resistors 52 and 53, is such that the amplitude of the voltage at junction point 54, designated 135, is something less than the peak values of the synch and data pulses in waveform 133'. In consequence thereof, the application of voltage 135 to diode 68 back-biases the diode insofar as noise is concerned but permits the upper portions or peaks of the synch and data pulses to get through. The portions of synch pulse 133a' and data pulses 133b', 133c' and 133d' actually passed through diode 68 is shown in waveform 136 presented on the expanded time scale previously used and is respectively designated 136a, 136b, 136c and 136d. Waveform 136 is applied to inverter 73 which reverses the polarity of the waveform to produce waveform 137 having pulses 137a, 137b, 137c and 137d. Waveforms 136 and 137 are identical except that one is a mirror image of the other.

Leaving waveforms 136 and 137 for the moment, reference is made to voltage-controlled oscillator 77 which generates a train of clock pulses 138. The occurrence of these clock pulses may be advanced or retarded according to whether a positive or negative biasing voltage is applied to the oscillator as will be explained later. Clock pulses 138 are applied to flip-flop circuit 74 which, as is well known, will produce two trains of rectangular pulses in response thereto. The pulse trains produced by flip-flop 74 are designated 139 and 140 in FIGURE 6 and, as may be expected, the pulses produced at one flip-flop output are the complements of the pulses out of the other flip-flop output. Pulses 139 and 140 are respectively applied to AND gates 71 and 70, signals 136 and 137 also being respectively applied to these gates. As a result, gates 70 and 71 pass those portions of signals 136 and 137 that coincide with pulses 139 and 140. In other words, each pulse in waveform 139 activates gate 71 by putting it in a conducting state so that the portion of waveform 136 that coincides with a waveform 139 pulse passes through the gate. Each pulse in waveform 140 similarly activates gate 70 so that the portion of waveform 137 coinciding with a waveform 140 pulse passes through the gate. As a result of the described gating activity, pulse trains 141 and 142 are respectively passed through gates 71 and 70 and applied to summing circuit 72 wherein they are linearly added to form waveform 143 shown in the figure.

Waveform 143 is fed to low-pass filter 75 which, in response thereto, produces a direct-current voltage that may either be positive or negative. It is also possible that zero output will be developed by filter 75 in response to waveform 143. The magnitude and polarity of the filter output is determined by the total area under curve 143, a positive voltage 144 being produced if the total area is positive, a negative voltage being produced if the area is negative, and a zero output resulting if the total area under the curve is zero. A zero output from filter 75 is the desired situation for it means that flip-flop circuit 74 is being activated at the proper time and it means also that the pulses of waveform 139 out of the flip-flop are being applied to counter 47 at the right time. On the other hand, if a positive or a negative signal is produced by filter 75, it respectively means that the pulses of waveform 138 out of oscillator 77 are retarded and need to be advanced in time or advanced and need to be retarded in time. Accordingly, the signal out of filter 75 is applied to D.C. amplifier 76 for amplification and thereafter is applied to voltage-controlled oscillator 77 wherein it shifts the pulses of waveform 138 generated by the oscillator. If a positive voltage such as voltage 144 is applied to the oscillator, then waveform 138 and, therefore, waveforms 139 and 140, are shifted to the right in the figure, which is to say that the pulses in these waveforms are advanced in time. On the other hand, if a negative voltage such as voltage 145 is applied to the oscillator, then waveform 138 and, consequently, waveforms 139 and 140, are shifted to the left in the figure, which is to say that the pulses of these waveforms are retarded in time. Whenever either of these shifts take place, the total area under curve 143 tends toward zero, the shift continuing until the area is zero, at which time the amplitude of the signal out of filter 75 is likewise reduced to zero so that pulses 139 and 140 thereafter remain fixed at the proper time of occurrence. By proper time of occurrence it is meant that counter 47 is activated by the pulses of waveform 139 in such a manner that its output signals may be used at preselected times to accurately reproduce the data signals originally applied to the Airborne unit.

Keeping in mind that waveform 139 is applied to counter 47, reference is now made to buffer amplifier 37 at whose output end waveform 133' appears. A portion of waveform 133' is reproduced in FIGURE 7, the portion reproduced being stretched out for the purpose of clarifying the explanation. Furthermore, it will be noted from the figure that noise has been superimposed upon waveform 133' since noise must be taken into consideration at this point in the discussion. Waveform 133' together with the noise is applied to the anode of diode 42 and, at the same time this is done, a sharp negative pulse is applied at the end of each data period to junction point 65 whereat the cathodes of diodes 63 and 64 are joined. These negative pulses are shown as waveform 147 in FIG. 7 and as a result of the application of these negative pulses to junction point 65 and the application of waveform 133' to diode 42, voltage waveform 148 appears across capacitor 62.

Figure 7:
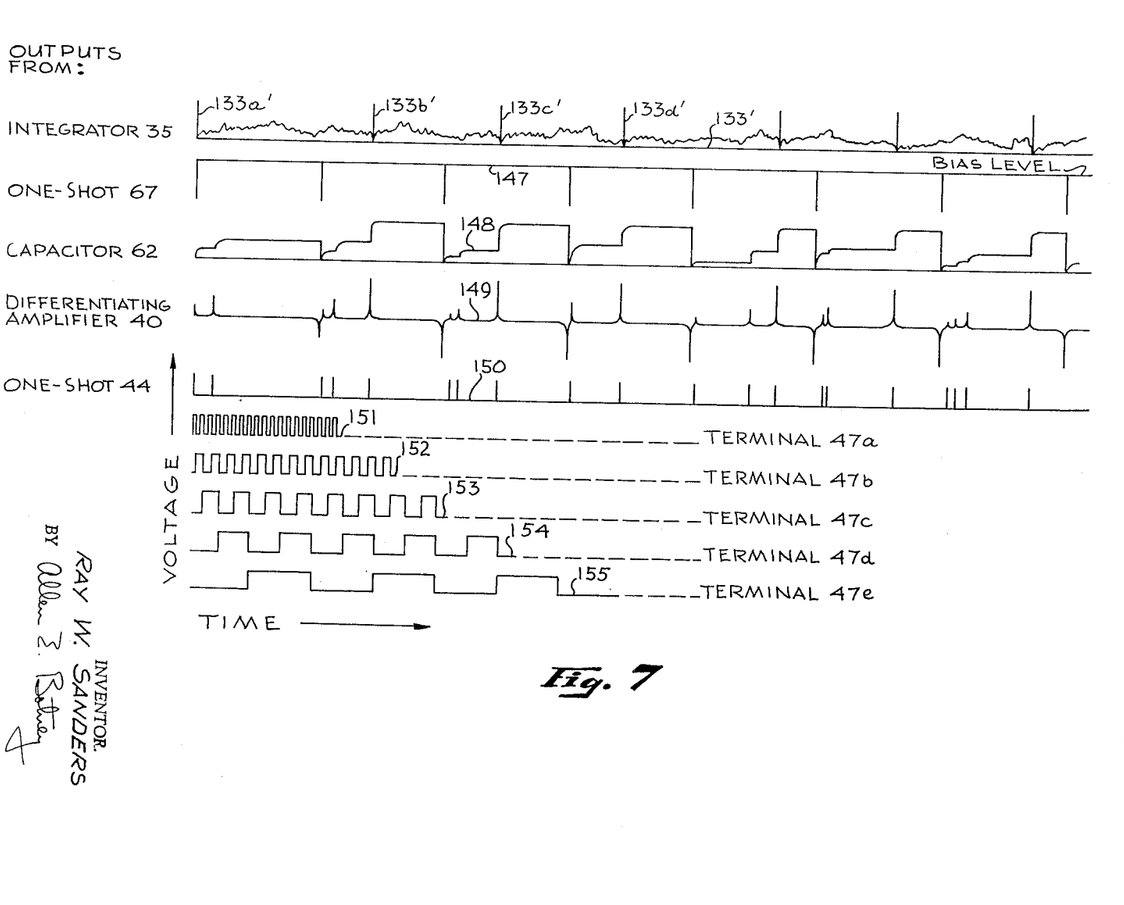

More specifically, during a data period each voltage peak of waveform 133' passing through diode 42 to capacitor 62 charges the capacitor up until the voltage across it is equal to the peak voltage just passed through the diode. The capacitor remains at that voltage and, therefore, keeps diode 42 back-biased at the same voltage until the next peak voltage comes along that exceeds the stated bias voltage. Thus, capacitor 62 charges up each time to the peak voltage of waveform 133' that is highest to that time. It will be obvious to those skilled in the art that the data pulses, such as data pulses 133b', 133c', 133d', etc., are most likely to introduce the highest peak voltages to which the capacitor will charge. This process continues until the end of a data period, at which time a negative pulse in waveform 147 occurs which causes both diodes 63 and 64, previously back-biased by voltage 133', to become forward-biased. In consequence thereof, capacitor 62 is shorted to ground and it rapidly discharges. The process just described repeats itself during each data period, with the result that voltage waveform 148 is produced across capacitor 62.

Waveform 148 is applied to differentiating amplifier 40 wherein it is differentiated to produce the sequence of pulses shown as waveform 149. It will be noted from a comparison of waveforms 148 and 149 that the pulses of waveform 149 coincide with the charge and discharge times of capacitor 62, as may be expected. Pulses 149 are applied to one-shot multivibrator 44 which is adapted to respond to the positive pulses to produce corresponding clock-type pulses that form waveform 150 in FIG. 7. These clock-type pulses are applied to gating circuits 45.

Returning now to counter 47, after the counter is reset by a reset pulse out of one-shot multivibrator 46 it operates in response to the pulses out of flip-flop 74 to respectively produce pulse waveforms 151 to 155 at its output terminals 47a to 47e. It will be recognized from what has been said previously that waveforms 151 to 155 are also shifted, that is, advanced or retarded in time whenever shifts occur with respect to the waveform out of voltage-controlled oscillator 77. As mentioned before, these shifts ensure that the pulses out of counter 47 will occur at times that will permit an accurate reproduction of the data signals originally applied to the Airborne unit. Accordingly, at the end of each data period, that is, at the time the lagging or declining edges of waveform 155 occur, a pulse is applied to one-shot multivibrator 67 which is thereby activated to produce pulse waveform 147 whose function was previously described.

Pulse waveforms 151 to 155 are applied via terminals 47a to 47e to gates 45 which are normally gated "OFF" but are gated "ON" by the pulses of waveform 150 to pass the counter output to storage or memory unit 78. In storage 78, the signals out of the counter are recorded or retained until the next batch of counter signals comes along, at which time the counter signals previously stored are passed to gates 66. Thus, each group or combination of signals stored in storage 78 leaves the storage unit to make room for the next group of signals to be stored therein, the signals leaving being applied to gating circuits 66. These gating circuits are normally biased to an "OFF" condition so that the signals applied to them out of storage 78 are normally not passed through to digital-to-analog converter 80.

However, at the end of each data period a waveform 147 pulse is applied to gates 66 to put them in an "ON" condition, which means that the combination of pulses produced by storage 78 at this time passes through the gating circuits to digital-to-analog converter 80. Gates 45 are also in an "ON" condition at the end of each data period because one-shot 44 applies a pulse to them at this time as may be seen from waveform 150. Furthermore, the combination of pulses stored in storage 78 at the end of a data period is representative of a transmitted data signal since, as will be remembered, the last pulse applied to gates 45 in each data period is most likely a data pulse. Hence, when a reset pulse is applied from one-shot 46 to counter 47 at the end of each data period, the counter is activated to apply a pulse combination through gates 45 which are open at this moment to storage 78. This new signal combination is stored in storage 78 and, as previously explained, thereby releases or "reads out" the signal combination already stored therein, which is the signal combination stored in the storage unit when the data pulse was applied to gates 45.

Thus, at the end of each data period a combination of pulses is fed from storage 78 through gates 66 to digital-to-analog converter 80 wherein, in a well-known manner, the pulse combination is converted to an analog signal. This analog signal is substantially the same as one of the analog signals applied to one of the input terminals to the Airborne unit and, with the aid of decommutator 81, it is applied to the appropriate output terminal 82. To ensure that the output of the digital-to-analog converter will feed the analog signal to the correct output terminal, decommutator 81 is reset at the end of each data interval, that is, after each group of twenty-nine data periods. The reset pulse is applied by one-shot 46, as may be seen from the figure, the manner in which the reset pulse is generated having been delineated previously.

Thus, one embodiment of the invention, as illustrated in the drawings, has been described both as to its construction and mode of operation. However, the invention is not limited thereto. Accordingly, the invention should be considered to include any and all modifications, alterations or equivalent arrangements falling within the scope of the appended claims. For example, it would be possible to apply substantially the same signal or waveform to integrator 35 in FIG. 2 simply by replacing the combination of delay apparatus 28, inverter 33 and summing circuit 31 with a shorted delay line having a total time delay equal to that of delay apparatus 28. The combination of delay apparatus 30, inverter 34 and summing circuit 32 may similarly be replaced with an appropriate shorted delay line.

Having thus described the invention, what is claimed as new is:

1. A transmitter for radiating pulsed carrier signals representing analog signals applied thereto, said transmitter comprising: means for electrically marking off equal periods of time; means for generating a rising voltage on a repetitive basis; and means for radiating a pulsed carrier signal of fixed duration during each of said periods at a time following the start of each period when said analog signal equals the instantaneous value of said rising voltage that corresponds to the amplitude of the analog signal during that period, whereby the variations in the time spacing between the pulsed carrier signals corresponds to the amplitude variations of the analog signal.

2. A transmitter for radiating pulsed carrier signals representing a plurality of n data signals applied thereto, said transmitter comprising: first means for sampling the n data signals during an interval of time to respectively produce n voltage samples in n data time periods; second means for generating an increasing voltage during each of said data time periods; and third means coupled to said first and said second means and operable in response to said voltages therefrom for radiating a pulsed carrier signal at a time during each data time period when the increasing and sample voltages become equal, thereby to radiate a train of pulsed carrier signals whose time spacing corresponds to the amplitude variations of the data signals.

3. A transmitter for radiating pulsed carrier signals representative of a plurality of n data signals applied thereto, said transmitter comprising: first means for periodically generating a synchronizing pulse having a first duration; second means receptive of the n data signals and operable in response thereto to respectively produce n data pulses of a second duration and of a variable time spacing therebetween between successive synch pulses, the variable time spacing between said data pulses respectively corresponding to the amplitude differences between said applied data signals; and third means coupled to said second means for generating pulsed carrier signals in response to said synch and data pulses.

4. A transmitter for radiating pulsed carrier signals representative of a plurality of $n$ data signals applied thereto, where $n$ is an integer greater than zero, said transmitter comprising: a commutator for sampling each of the $n$ applied data signals during a predetermined interval of time, said commutator generating a synch pulse between successive time intervals; oscillator means for generating a train of clock pulses; voltage means coupled to said oscillator means and operable in response to the clock pulses therefrom for producing a staircase voltage during each data sampling period that increases by equal increments; a coincidence circuit coupled to said commutator and to said voltage means for producing a data pulse of a first duration during each data sampling period when a staircase voltage becomes equal to a data voltage sample, thereby producing $n$ data pulses of variable time spacing therebetween during each interval of time; synch means coupled to said commutator and operable in response to each synch pulse therefrom for producing another synch pulse of a second duration; and pulse modulator means coupled to said coincidence circuit and to said synch means and respectively operable in response to the data and synch pulses therefrom for producing pulsed carrier signals.

5. A transmitter for radiating pulsed carrier signals representative of a plurality of $n$ data signals applied thereto, where $n$ is an integer greater than zero, said transmitter comprising: a commutator for sampling each of the $n$ applied data signals during a predetermined interval of time, said commutator generating a synch pulse between successive time intervals; oscillator means for generating a train of clock pulses; voltage means coupled to said oscillator means and operable in response to the clock pulses therefrom for producing a staircase voltage during each data sampling period that increases by equal increments; a coincidence circuit coupled to said commutator and to said voltage means for producing a data pulse during each data sampling period when a staircase voltage becomes equal to a data voltage sample, thereby producing $n$ data pulses of variable time spacing therebetween during each interval of time; a gating circuit coupled to said commutator and to said oscillator means, said circuit being operable in response to each synch pulse for passing clock pulses for the duration thereof; first pulse means coupled to said gating circuit and operable in response to the first clock pulse pased through in response to a synch pulse to produce another synch pulse having a first predetermined duration; an inhibit gate coupled to said coincidence circuit, said oscillator means and said commutator, said inhibit gate being operable when a synch pulse is applied thereto to prevent the passage of any signals therethrough and, in the absence of a synch pulse, operable in response to a data pulse to pass clock pulses therethrough for the duration thereof; second pulse means coupled to said inhibit gate and operable in response to the first clock pulse passed therethrough in response to a data pulse to produce another data pulse having a second predetermined duration; and output means coupled to said first and second pulse means for radiating pulsed carrier signals in response to said other data and synch pulses, whereby pulsed carrier synch signals of said first duration are periodically radiated and $n$ variably time-spaced pulsed carrier data signals are radiated between each pair thereof, the time spacing between said pulsed carrier data signals varying as the amplitude between the corresponding $n$ applied data signals.

6. A receiver for converting variably time-spaced pulsed carrier signals representing the amplitude variations of a plurality of $n$ analog signals to the analog signals, said receiver comprising: means for periodically generating $m$ groups of pulses respectively corresponding to $m$ analog signal amplitude levels; a digital-to-analog converter for producing an analog signal in response to each group of pulses applied thereto, the amplitude of said produced analog signal corresponding to the applied group of pulses; and gating apparatus coupled between said means and said digital-to-analog converter, said gating apparatus normally preventing passage of pulse groups from said means to said converter and operable in response to each pulsed carrier signal to pass an existing pulse group to said converter, the differences between the groups of pulses passed corresponding to the variable time-spacing of the pulsed carrier.

7. A telemetry system for communicating an analog signal between two locations, said system comprising: first means at one location for electrically marking off equal periods of time; second means generating a rising voltage on a repetitive basis; different means coupled to said first means and receptive of the analog signal for radiating a pulsed carrier signal of fixed duration during each of said periods at a time following the start of each period when said analog signal equals the instantaneous value of said rising voltage that corresponds to the amplitude of the analog signal during that period, the variations in the time-spacing between the pulsed carrier signals thereby corresponding to the amplitude variations of the analog signal; third means at the other location for generating $m$ groups of pulses during each of said periods that respectively correspond to $m$ analog signal amplitude levels; fourth means for producing a sample of an analog signal for each group of pulses applied thereto, the amplitude of said analog sample corresponding to the applied group of pulses; and gating apparatus coupled between said third and fourth means, said apparatus normally preventing passage of pulse groups from said third means to said fourth means and operable in response to each pulsed carrier signal to pass an existing pulse group to said fourth means, the differences between the groups of pulses passed corresponding to the variable time spacing of said pulsed carrier signals.

8. A telemetry system for communicating a plurality of $n$ data signals between two locations, said system comprising: first means at one location for sampling the $n$ data signals during an interval of time to respectively produce $n$ voltage samples in $n$ data time periods; second means for generating an increasing voltage during each of said data time periods; third means coupled to said first and second means and operable in response to said voltages therefrom for radiating a pulsed carrier signal at a time during each data time period when the increasing and sample voltages become equal, thereby to radiate a train of pulsed carrier signals whose time spacing corresponds to the amplitude variations of the data signals; fourth means at the other location for generating $m$ groups of pulses during each of said periods that respectively correspond to $m$ data signal amplitude levels; fifth means for producing a sample of a data signal for each group of pulses applied thereto, the amplitude of said data sample corresponding to the applied group of pulses; and gating apparatus coupled between said fourth and fifth means, said apparatus normally preventing passage of pulse groups from said fourth means to said fifth means and operable in response to each pulsed carrier signal to pass an existing pulse group to said fifth means, the differences between the passed groups of pulses corresponding to the variable time spacing of said pulsed carrier signals.

9. A telemetry system for communicating a plurality of $n$ data signals between two locations, said system comprising: first means at one location for periodically generating a synchronizing pulse having a first duration; different means for generating a rising voltage on a repetitive basis; second means receptive of the $n$ data signals and operable in response thereto to respectively produce $n$ data pulses of a second duration and of a variable time spacing therebetween between successive synch pulses, the variable time spacing between said data pulses respectively corresponding to the amplitude differences between said applied data signals, said data pulses being generated when said data signals are equal to said rising voltage; third means coupled to said first and second means for generating pulsed carrier signals in response to said synchronizing and data pulses; fourth means at the other location receptive of the synchronizing pulses and operable to recurrently generate $m$ groups of pulses during each of $n$ data periods between synchronizing pulses, said $m$ groups of pulses respectively corresponding to $m$ data signal amplitude levels; fifth means for producing a sample of a data signal for each group of pulses applied thereto, the amplitude of said data sample corresponding to the applied group of pulses; and gating apparatus coupled between said fourth and fifth means, said apparatus normally preventing passage of pulse groups from said fourth means to said fifth means and operable in response to each pulsed carrier signal to pass an existing pulse group to said fifth means, the differences between the passed groups of pulses corresponding to the variable time spacing of said pulsed carrier signals representing data signals.

10. A telemetry system for communicating a plurality of $n$ data signals between two locations, said system comprising: a commutator at one location for sampling each of the $n$ applied data signals during a predetermined interval of time, said commutator generating a synchronizing pulse between successive time intervals; oscillator means for generating a train of clock pulses; voltage means coupled to said oscillator means and operable in response to the clock pulses therefrom for producing a staircase voltage during each data sampling period that increases by equal increments; a coincidence circuit coupled to said commutator and to said voltage means for producing a data pulse of a first duration during each data sampling period when a staircase voltage becomes equal to a data voltage sample, thereby producing $n$ data pulses of variable time spacing therebetween during each interval of time; synch means coupled to said commutator and operable in response to each synchronizing pulse therefrom for producing another synchronizing pulse of a second duration; and pulse modulator means coupled to said coincidence circuit and to said synch means and respectively operable in response to the data and synchronizing pulses therefrom for producing pulsed carrier signals that are variably time-spaced in the same manner as said variably time-spaced data pulses; circuit means at the other location receptive of the synchronizing and data pulsed carrier signals and operable in response thereto to recurrently generate $m$ groups of pulses during each of $n$ data periods between synchronizing pulses, said $m$ groups of pulses respectively corresponding to $m$ data signal amplitude levels; a digital-to-analog converter for producing a sample of a data signal for each group of pulses applied thereto, the amplitude of said data sample corresponding to the applied group of pulses; and gating apparatus coupled between said circuit means and said digital-to-analog converter, said apparatus normally preventing passage of pulse groups from said circuit means to said converter and operable in response to each pulsed carrier signal to pass an existing pulse group to said converter, the differences between the passed groups of pulses corresponding to the variable time spacing of said pulsed carrier signals representing data signals.

11. A telemetry system for communicating a plurality of $n$ data signals between two locations, said system comprising: a commutator at one location for sampling each of the $n$ applied data signals during a predetermined interval of time, said commutator generating a synch pulse between successive time intervals; oscillator means for generating a train of clock pulses; voltage means coupled to said oscillator means and operable in response to the clock pulses therefrom for producing a staircase voltage during each data sampling period that increases by equal increments; a coincidence circuit coupled to said commutator and to said voltage means for producing a data pulse during each data sampling period when a staircase voltage becomes equal to a data voltage sample, thereby producing $n$ data pulses of variable time spacing therebetween during each interval of time; a gating circuit coupled to said commutator and to said oscillator means, said circuit being operable in response to each synch pulse for passing clock pulses for the duration thereof; first pulse means coupled to said gating circuit and operable in response to the first clock pulse passed through in response to a synch pulse to produce another synch pulse having a first predetermined duration; an inhibit gate coupled to said coincidence circuit, said oscillator means and said commutator, said inhibit gate being operable when a synch pulse is applied thereto to prevent the passage of any signals therethrough and, in the absence of a synch pulse, operable in response to a data pulse to pass clock pulses therethrough for the duration thereof; second pulse means coupled to said inhibit gate and operable in response to the first clock pulse passed therethrough in response to a data pulse to produce another data pulse having a second predetermined duration; output means coupled to said first and second pulse means for radiating pulsed carrier signals in response to said other data and synch pulses, whereby pulsed carrier synch signals of said first duration are periodically radiated and $n$ variably time-spaced pulsed carrier data signals of said second duration are radiated between each pair thereof, the time spacing between said pulsed carrier data signals varying as the amplitude between the corresponding $n$ applied data signals; circuit means at the other location receptive of the synchronizing and data pulsed carrier signals and operable in response thereto to recurrently generate $m$ groups of pulses during each of $n$ data periods between synchronizing pulses, said $m$ groups of pulses respectively corresponding to $m$ data signal amplitude levels; a digital-to-analog converter for producing a sample of a data signal for each group of pulses applied thereto, the amplitude of said data sample corresponding to the applied group of pulses; and gating apparatus coupled between said circuit means and said digital-to-analog converter, said apparatus normally preventing passage of pulse groups from said circuit means to said converter and operable in response to each pulsed carrier signal to pass an existing pulse group to said converter, the differences between the passed groups of pulses corresponding to the variable time spacing of said pulsed carrier signals representing data signals.

12. Receiver apparatus for reproducing $n$ data signals from variably time-spaced pulsed carrier signals of a first duration representing the amplitude variations of these data signals, each sequence of $n$ pulsed carrier signals of said first duration being preceded by a pulsed carrier signal of a second duration, said apparatus comprising: synch means for distinguishing between signals of different duration, said synch means being receptive of the pulsed carrier signals and adapted to produce a synchronizing pulse in response to each pulsed carrier signal of the second duration; an adjustable electronic counter arrangement for recurrently generating $m$ groups of pulses respectively corresponding to $m$ data signal amplitude levels, said arrangement being coupled to be reset by said synchronizing pulses in order to establish points of reference from which the sequences of $m$ pulse groups may respectively be generated; a digital-to-analog converter for producing a data signal in response to a group of pulses applied thereto, the amplitude of said produced data signal corresponding to the particular one of said $m$ pulse groups that is applied; a storage unit for storing each group of pulses applied thereto; a first gating network coupled between said storage unit and said counter arrangement, said first network normally preventing passage of pulse groups from said counter arrangement to said storage unit and operable in response to each pulse carrier signal to pass an existing pulse group to said storage unit; means coupled to said counter arrangement for producing a control pulse each time said counter arrangement is reset; and a second gating network coupled between said storage unit and said digital-to-analog converter and coupled to said means, said second circuit normally preventing passage of a stored pulse group to said converter and operable in response to a control pulse to pass to said converter the pulse group most recently stored in said storage unit.

13. A telemetry system for communicating $n$ data signals between two locations, said system comprising: first means at one location receptive of the $n$ data signals and operable in response thereto to periodically produce $n$ data pulses of a first duration and of a variable time spacing therebetween, the variable time spacing between said data pulses respectively corresponding to the amplitude differences between the data signals; second means for preceding each sequence of $n$ data pulses with a synchronizing pulse having a second duration; third means coupled to said first and second means for generating pulsed carrier signals in response to said synchronizing and data pulses; synch means at the other location for distinguishing between signals of different duration, said synch means being receptive of the pulsed carrier signals and adapted to produce a synchronizing pulse in response to each pulsed carrier signal of the second duration; an adjustable electronic counter arrangement for recurrently generating $m$ groups of pulses respectively corresponding to $m$ data signal amplitude levels, said arrangement being coupled to be reset by said synchronizing pulses in order to establish points of reference from which the sequences of $m$ pulse groups may respectively be generated; a digital-to-analog converter for producing a data signal in response to a group of pulses applied thereto, the amplitude of said produced data signal corresponding to the particular one of said $m$ pulse groups that is applied; a storage unit for storing each group of pulses applied thereto; a first gating network coupled between said storage unit and said counter arrangement, said first network normally preventing passage of pulse groups from said counter arrangement to said storage unit and operable in response to each pulsed carrier signal to pass an existing pulse group to said storage unit; means coupled to said counter arrangement for producing a control pulse each time said counter arrangement is reset; and a second gating network coupled between said storage unit and said digital-to-analog converter and coupled to said means, said second circuit normally preventing passage of a stored pulse group to said converter and operable in response to a control pulse to pass to said converter the pulse group most recently stored in said storage unit.

14. A telemetry system for communicating $n$ data signals between two locations, said system comprising: a commutator at one location for sampling each of the $n$ data signals during a predetermined interval of time, said commutator generating a synchronizing pulse between successive time intervals; oscillator means for generating a train of clock pulses; voltage means coupled to said oscillator means and operable in response to the clock pulses therefrom for producing a staircase voltage during each data sampling period that increases by equal increments; a coincidence circuit coupled to said commutator and to said voltage means for producing a data pulse of a first duration during each data sampling period when a staircase voltage becomes equal to a data voltage sample, thereby producing $n$ data pulses of said first duration and of variable time spacing therebetween during each interval of time; circuit means coupled to said commutator and operable in response to each synchronizing pulse therefrom for producing another synchronizing pulse of a second duration; pulse modulator means coupled to said coincidence circuit and to said circuit means and respectively operable in response to the data and synchronizing pulses therefrom for producing pulsed carrier signals that have the same duration and time spacing; synch means at the other location for distinguishing between signals of different duration, said synch means being receptive of the pulsed carrier signals and adapted to produce a synchronizing pulse in response to each pulsed carrier signal of the second duration; an adjustable electronic counter arrangement for recurrently generating $m$ groups of pulses respectively corresponding to $m$ data signal amplitude levels, said arrangement being coupled to be reset by said synchronizing pulses in order to establish points of reference from which the sequences of $m$ pulse groups may respectively be generated; a digital-to-analog converter for producing a data signal in response to a group of pulses applied thereto, the amplitude of said produced data signal corresponding to the particular one of said $m$ pulse groups that is applied; a storage unit for storing each group of pulses applied thereto; a first gating network coupled between said storage unit and said counter arrangement, said first network normally preventing passage of pulse groups from said counter arrangement to said storage unit and operable in response to each pulsed carrier signal to pass an existing pulse group to said storage unit; means coupled to said counter arrangement for producing a control pulse each time said counter arrangement is reset; and a second gating network coupled between said storage unit and said digital-to-analog converter and coupled to said means, said second circuit normally preventing passage of a stored pulse group to said converter and operable in response to a control pulse to pass to said converter the pulse group most recently stored in said storage unit.

15. A telemetry system for communicating $n$ data signals between two locations, said system comprising: a commutator at one location for sampling each of the $n$ applied data signals during a predetermined interval of time, said commutator generating a synch pulse between successive time intervals; oscillator means for generating a train of clock pulses; voltage means coupled to said oscillator means and operable in response to the clock pulses therefrom for producing a staircase voltage during each data sampling period that increases by equal increments; a coincidence circuit coupled to said commutator and to said voltage means for producing a data pulse during each data sampling period when a staircase voltage becomes equal to a data voltage sample, thereby producing $n$ data pulses of variable time spacing therebetween during each interval of time; a gating circuit coupled to said commutator and to said oscillator means, said circuit being operable in response to each synch pulse for passing clock pulses for the duration thereof; first pulse means coupled to said gating circuit and operable in response to the first clock pulse passed through in response to a synch pulse to produce another synch pulse having a first predetermined duration; an inhibit gate coupled to said coincidence circuit, said oscillator means and said commutator, said inhibit gate being operable when a synch pulse is applied thereto to prevent the passage of any signals therethrough and, in the absence of a synch pulse, operable in response to a data pulse to pass clock pulses therethrough for the duration thereof; second pulse means coupled to said inhibit gate and operable in response to the first clock pulse passed therethrough in response to a data pulse to produce another data pulse having a second predetermined duration; output means coupled to said first and second pulse means for radiating pulsed carrier signals in response to said other data and synch pulses, whereby pulsed carrier synch signals of said first duration are periodically radiated and $n$ variably time-spaced pulsed carrier data signals of said second duration are radiated between each pair thereof, the time spacing between said pulsed carrier data signals varying as the amplitude between the corresponding $n$ applied data signals; circuit means at the other synch means for distinguishing between signals of different duration, said synch means being receptive of the pulsed carrier signals and adapted to produce a synchronizing pulse in response to each pulsed carrier signal of said first duration; an adjustable electronic counter arrangement for recurrently generating $m$ groups of pulses respectively corresponding to $m$ data signal amplitude levels, said arrangement being coupled to be reset by said synchronizing pulses in order to establish points of reference from which the sequences of *m* pulse groups may respectively be generated; a digital-to-analog converter for producing a data signal in response to a group of pulses applied thereto, the amplitude of said produced data signal corresponding to the particular one of said *m* pulse groups that is applied; a storage unit for storing each group of pulses applied thereto; a first gating network coupled between said storage unit and said counter arrangement, said first network normally preventing passage of pulse groups from said counter arrangement to said storage unit and operable in response to each pulsed carrier signal to pass an existing pulse group to said storage unit; means coupled to said counter arrangement for producing a control pulse each time said counter arrangement is reset; and a second gating network coupled between said storage unit and said digital-to-analog converter and coupled to said means, said second circuit normally preventing passage of a stored pulse group to said converter and operable in response to a control pulse to pass to said converter the pulse group most recently stored in said storage unit.

16. Receiver apparatus for reproducing *n* data signals from variably time-spaced pulsed carrier signals of a first duration representing the amplitude variations of these data signals, each sequence of *n* pulsed carrier signals of said first duration being preceded by a pulsed carrier signal of a second duration that is longer than said first duration, said apparatus comprising: receiver means for demodulating the pulsed carrier signals to produce corresponding sequences of *n* video pulses of the first duration preceded by video pulses of the second duration; first means coupled to said receiver means for delaying and inverting said video pulses, the period of delay being equal to the second duration; second means coupled to said receiver means and said first means for linearly adding the instantaneous values of the video pulses therefrom to produce a train of composite video pulses; third means connected to said second means for integrating said train of composite video pulses to produce a corresponding train of substantially triangular-shaped pulses, the triangular-shaped pulses produced in response to the composite video pulses of the second duration being of greater amplitude than those produced in response to the composite video pulses of the first duration; first threshold means coupled to said third means and biased to produce synchronizing pulses only in response to composite video pulses of the second duration; an adjustable electronic counter arrangement for recurrently generating *m* groups of pulses respectively corresponding to *m* data signal amplitude levels, said arrangement being coupled to said threshold means to be reset by said synchronizing pulses in order to establish starting points from which the sequences of *m* pulse groups may respectively be generated; a digital-to-analog converter for producing a data signal in response to a group of pulses applied thereto, the amplitude of said produced data signal corresponding to the particular one of said *m* pulse groups that is applied; a storage unit for storing each group of pulses applied thereto; a first gating network coupled between said storage unit and said counter arrangement, said first network normally preventing passage of pulse groups from said counter arrangement to said storage unit and operable in response to a data pulse to pass an existing pulse group to said storage unit; means coupled to said counter arrangement for producing a control pulse each time said counter arrangement is reset; a second gating network coupled between said storage unit and said digital-to-analog converter and coupled to said means, said second circuit normally preventing passage of a stored pulse group to said converter and operable in response to a control pulse to pass to said converter the pulse group most recently stored in said storage unit; fourth means coupled to said receiver means for delaying and inverting said video pulses, the period of delay being equal to the first duration; fifth means coupled to said receiver means and said fourth means for linearly adding the instantaneous values of the video pulses therefrom to produce another train of composite video pulses; sixth means connected to said fifth means for integrating said train of composite video pulses to produce a corresponding train of substantially triangular-shaped pulses of substantially the same amplitude; and second threshold means coupled between said sixth means and said first gating network and biased to apply data pulses to said second network in response to said train of triangular-shaped pulses, the variable time spacing of said data pulses being the same as that of the pulsed carrier signals representing the amplitude variations of the data signals.

17. A telemetry system for communicating *n* data signals between two locations, said system comprising: input means at one location receptive of the *n* data signals and operable in response thereto to periodically produce *n* data pulses of a first duration and of a variable time spacing therebetween, the variable time spacing between said data pulses respectively corresponding to the amplitude differences between the data signals; intermediate means for preceding each sequence of *n* data pulses with a synchronizing pulse having a second duration; output means coupled to said input and intermediate means for generating pulsed carrier signals in response to said synchronizing and data pulses; receiver means at the other location for demodulating the pulsed carrier signals to produce corresponding sequences of *n* video pulses of the first duration preceded by video pulses of the second duration; first means coupled to said receiver means for delaying and inverting said video pulses, the period of delay being equal to the second duration; second means coupled to said receiver means and said first means for linearly adding the instantaneous values of the video pulses therefrom to produce a train of composite video pulses; third means connected to said second means for integrating said train of composite video pulses to produce a corresponding train of substantially triangular-shaped pulses, the triangular-shaped pulses produced in response to the composite video pulses of the second duration being of greater amplitude than those produced in response to the composite video pulses of the first duration; first threshold means coupled to said third means and biased to produce synchronizing pulses only in response to composite video pulses of the second duration; an adjustable electronic counter arrangement for recurrently generating *m* groups of pulses respectively corresponding to *m* data signal amplitude levels, said arrangement being coupled to said threshold means to be reset by said synchronizing pulses in order to establish starting points from which the sequences of *m* pulse groups may respectively be generated; a digital-to-analog converter for producing a data signal in response to a group of pulses applied thereto, the amplitude of said produced data signal corresponding to the particular one of said *m* pulse groups that is applied; a storage unit for storing each group of pulses applied thereto; a first gating network coupled between said storage unit and said counter arrangement, said first network normally preventing passage of pulse groups from said counter arrangement to said storage unit and operable in response to a data pulse to pass an existing pulse group to said storage unit; means coupled to said counter arrangement for producing a control pulse each time said counter arrangement is reset; a second gating network coupled between said storage unit and said digital-to-analog converter and coupled to said means, said second circuit normally preventing passage of a stored pulse group to said converter and operable in response to a control pulse to pass to said converter the pulse group most recently stored in said storage unit; fourth means coupled to said receiver means for delaying and inverting said video pulses, the period of delay being equal to the first duration; fifth means coupled to said receiver means and said fourth means for linearly adding the instantaneous values of the video pulses therefrom to produce another train of composite video pulses; sixth means connected to said fifth means for integrating said train of composite video pulses to produce a corresponding train of substantially triangular-shaped pulses of substantially the same amplitude; and second threshold means coupled between said sixth means and said first gating network and biased to apply data pulses to said second network in response to said train of triangular-shaped pulses, the variable time spacing of said data pulses being the same as that of the pulsed carrier signals representing the amplitude variations of the data signals.

18. A telemetry system for communicating n data signals between two locations, said system comprising: a commutator at one location for sampling each of the n data signals during a predetermined interval of time, said commutator generating a synchronizing pulse between successive time intervals; oscillator means for generating a train of clock pulses; voltage means coupled to said oscillator means and operable in response to the clock pulses therefrom for producing a staircase voltage during each data sampling period that increases by equal increments; a coincidence circuit coupled to said commutator and to said voltage means for producing a data pulse of a first duration during each data sampling period when a staircase voltage becomes equal to a data voltage sample, thereby producing n data pulses of said first duration and of variable time spacing therebetween during each interval of time; circuit means coupled to said commutator and operable in response to each synchronizing pulse therefrom for producing another synchronizing pulse of a second duration; pulse modulator means coupled to said coincidence circuit and to said circuit means and respectively operable in response to the data and synchronizing pulses therefrom for producing pulsed carrier signals that have the same duration and time spacing; receiver means at the other location for demodulating the pulsed carrier signals to produce corresponding sequences of n video pulses of the first duration preceded by video pulses of the second duration; first means coupled to said receiver means for delaying and inverting said video pulses, the period of delay being equal to the second duration; second means coupled to said receiver means and said first means for linearly adding the instantaneous values of the video pulses therefrom to produce a train of composite video pulses; third means connected to said second means for integrating said train of composite video pulses to produce a corresponding train of substantially triangular-shaped pulses, the triangular-shaped pulses produced in response to the composite video pulses of the second duration being of greater amplitude than those produced in response to the composite video pulses of the first duration; first threshold means coupled to said third means and biased to produce synchronizing pulses only in response to composite video pulses of the second duration; an adjustable electronic counter arrangement for recurrently generating m groups of pulses respectively corresponding to m data signal amplitude levers, said arrangement being coupled to said threshold means to be reset by said synchronizing pulses in order to establish starting points from which the sequences of m pulse groups may respectively be generated; a digital-to-analog converter for producing a data signal in response to a group of pulses applied thereto, the amplitude of said produced data signal corresponding to the particular one of said m pulse groups that is applied; a storage unit for storing each group of pulses applied thereto; a first gating network coupled between said storage unit and said counter arrangement, said first network normally preventing passage of pulse groups from said counter arrangement to said storage unit and operable in response to a data pulse to pass an existing pulse group to said storage unit; means coupled to said counter arrangement for producing a control pulse each time said counter arrangement is reset; a second gating network coupled between said storage unit and said digital-to-analog converter and coupled to said means, said second circuit normally preventing passage of a stored pulse group to said converter and operable in response to a control pulse to pass to said converter the pulse group most recently stored in said storage unit; fourth means coupled to said receiver means for delaying and inverting said video pulses, the period of delay being equal to the first duration; fifth means coupled to said receiver means and said fourth means for linearly adding the instantaneous values of the video pulses therefrom to produce another train of composite video pulses; sixth means connected to said fifth means for integrating said train of composite video pulses to produce a corresponding train of substantially triangular-shaped pulses of substantially the same amplitude; and second threshold means coupled between said sixth means and said first gating network and biased to apply data pulses to said second network in response to said train of triangular-shaped pulses, the variable time spacing of said data pulses being the same as that of the pulsed carrier signals representing the amplitude variations of the data signals.

19. A telemetry system for communicating n data signals between two locations, said system comprising: a commutator at one location for sampling each of the n applied data signals during a predetermined interval of time, said commutator generating a synch pulse between successive time intervals; oscillator means for generating a train of clock pulses; voltage means coupled to said oscillator means and operable in response to the clock pulses therefrom for producing a staircase voltage during each data sampling period that increases by equal increments; a coincidence circuit coupled to said commutator and to said voltage means for producing a data pulse during each data sampling period when a staircase voltage becomes equal to a data voltage sample, thereby producing n data pulses of variable time spacing therebetween during each interval of time; a gating circuit coupled to said commutator and to said oscillator means, said circuit being operable in response to each synch pulse for passing clock pulses for the duration thereof; first pulse means coupled to said gating circuit and operable in response to the first clock pulse passed through in response to a synch pulse to produce another synch pulse having a first predetermined duration; an inhibit gate coupled to said coincidence circuit, said oscillator means and said commutator, said inhibit gate being operable when a synch pulse is applied thereto to prevent the passage of any signals therethrough and, in the absence of a synch pulse, operable in response to a data pulse to pass clock pulses therethrough for the duration thereof; second pulse means coupled to said inhibit gate and operable in response to the first clock pulse passed therethrough in response to a data pulse to produce another data pulse having a second predetermined duration; output means coupled to said first and second pulse means for radiating pulsed carrier signals in response to said other data and synch pulses, whereby pulsed carrier synch signals of said first duration are periodically radiated and n variably time-spaced pulsed carrier data signals of said second duration are radiated between each pair thereof, the time spacing between said pulsed carrier data signals varying as the amplitude between the corresponding n applied data signals; receiver means at the second location for demodulating the pulsed carrier signals to produce corresponding sequences of n video pulses of the second duration preceded by video pulses of the first duration; first means coupled to said receiver means for delaying and inverting said video pulses, the period of delay being equal to the first duration; second means coupled to said receiver means and said first means for linearly adding the instantaneous values of the video pulses therefrom to produce a train of composite video pulses; third means connected to said second means for integrating said train of composite video pulses to produce a corresponding train of substantially triangular-shaped pulses, the triangular-shaped pulses produced in response to the composite video pulses of the first duration being of greater amplitude than those produced in response to the composite video pulses of the second duration; first threshold means coupled to said third means and biased to produce synchronizing pulses only in response to composite video pulses of the first duration; an adjustable electronic counter arrangement for recurrently generating $m$ groups of pulses respectively corresponding to $m$ data signal amplitude levels, said arrangement being coupled to said threshold means to be reset by said synchronizing pulses in order to establish starting points from which the sequences of $m$ pulse groups may respectively be generated; a digital-to-analog converter for producing a data signal in response to a group of pulses applied thereto, the amplitude of said produced data signal corresponding to the particular one of said $m$ pulse groups that is applied; a storage unit for storing each group of pulses applied thereto; a first gating network coupled between said storage unit and said counter arrangement, said first network normally preventing passage of pulse groups from said counter arrangement to said storage unit and operable in response to a data pulse to pass an existing pulse group to said storage unit; means coupled to said counter arrangement for producing a control pulse each time said counter arrangement is reset; a second gating network coupled between said storage unit and said digital-to-analog converter and coupled to said means, said second circuit normally preventing passage of a stored pulse group to said converter and operable in response to a control pulse to pass to said converter the pulse group most recently stored in said storage unit; fourth means coupled to said receiver means for delaying and inverting said video pulses, the period of delay being equal to the second duration; fifth means coupled to said receiver means and said fourth means for linearly adding the instantaneous values of the video pulses therefrom to produce another train of composite video pulses; sixth means connected to said fifth means for integrating said train of composite video pulses to produce a corresponding train of substantially triangular-shaped pulses of substantially the same amplitude; and second threshold means coupled between said sixth means and said first gating network and biased to apply data pulses to said second network in response to said train of triangular-shaped pulses, the variable time spacing of said data pulses being the same as that of the pulsed carrier signals representing the amplitude variations of the data signals.

References Cited by the Examiner
UNITED STATES PATENTS

| | | | |
|---|---|---|---|
| 2,605,360 | 7/52 | Trevor | 179—15 |
| 2,680,240 | 6/54 | Greenfield | 340—183 |
| 2,760,002 | 8/56 | Van Weel | 179—15 |
| 2,852,609 | 9/58 | Plouffe | 179—15 |
| 2,866,970 | 12/58 | Hughes | 343—203 |
| 2,872,520 | 2/59 | Field | 179—15 |
| 2,917,728 | 12/59 | Grossman | 340—203 |
| 2,907,021 | 9/60 | Woods | 340—206 |

DAVID G. REDINBAUGH, *Primary Examiner.*

BENNETT G. MILLER, GEORGE G. WESTBY,
*Examiners.*